2 Sheets--Sheet 1.

D. LIPPY & Z. S. STOCKING.
Machines for Thrashing and Hulling Clover.

No. 146,137. Patented Jan. 6, 1874.

Witnesses
Chas. W. Palmer
L. D. Clarke

Inventors.
David Lippy
Z. S. Stocking
by their Attorney
Geo. W. Tibbitts

AM. PHOTO-LITHOGRAPHIC CO. N.Y. (OSBORNE'S PROCESS)

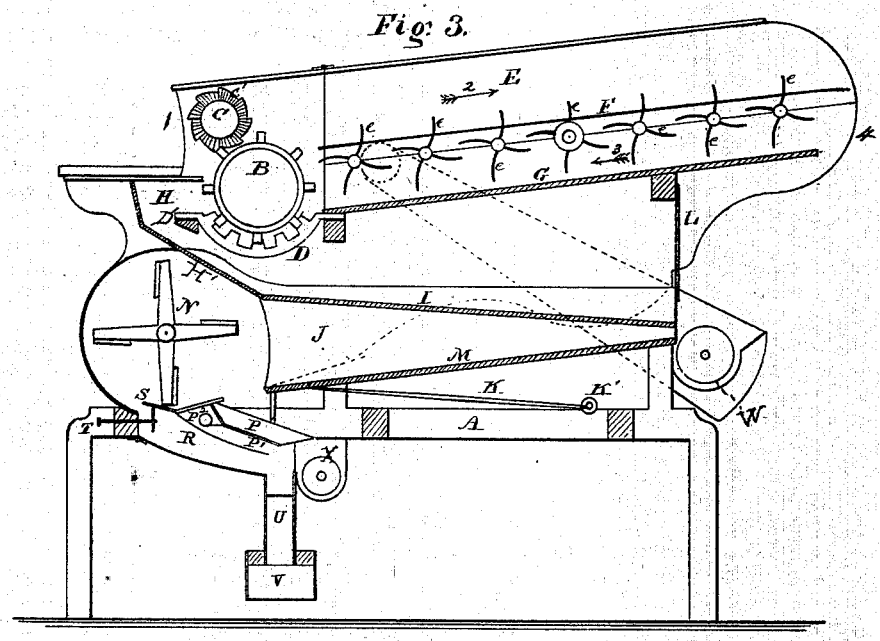
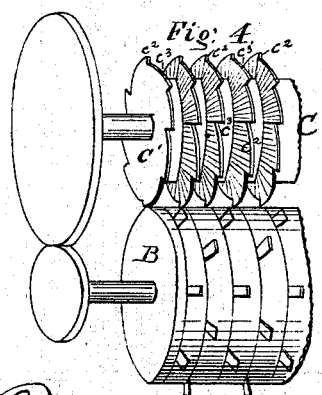
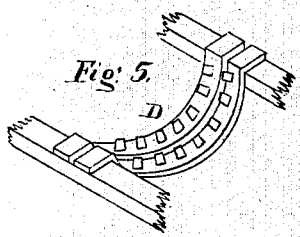

UNITED STATES PATENT OFFICE.

DAVID LIPPY, OF MANSFIELD, AND ZALMON S. STOCKING, OF CLEVELAND, OHIO.

IMPROVEMENT IN MACHINES FOR THRASHING AND HULLING CLOVER.

Specification forming part of Letters Patent No. 146,137, dated January 6, 1874; application filed August 20, 1873.

*To all whom it may concern:*

Be it known that we, DAVID LIPPY, of Mansfield, Richland county, Ohio, and ZALMON S. STOCKING, of the city of Cleveland, Ohio, have invented an Improvement in Clover Thrashing and Hulling Machines, of which the following is a specification:

Our invention relates, first, to the combination, with a revolving toothed cylinder and a thrashing-concave constructed in sections and provided with projecting teeth, of a cylindrical feeder formed of a series of disks, the peripheries of which are of unequal diameter, and present grooved and notched or ratchet-formed surfaces, leaving grooves or channels between each disk; second, to the combination, with the toothed cylinder, divided toothed concave, and feeder, before referred to, of a device for separating the straw from the clover-heads, consisting of a series of revolving toothed or pronged pickers, geared to revolve together by means of toothed pulleys and chains, a movable rack agitated or shaken by cams affixed on the picker-shafts, and an inclined deck or receiving board placed immediately under the picker, and so arranged that the pickers shall convey the clover-heads down the said incline to the divided toothed hulling-concave and toothed cylinder; third, to the combination, with the toothed cylinder, concave, and feeder and separator, before referred to, of a recess or chamber arranged in front of the toothed cylinder, into which the chaff is discharged, the said recess or chamber being provided with an inclined bottom, which forms a chute for the purpose of conducting the clover-seeds and chaff to an inclined vibrating screen. The invention also relates to the arrangement and construction of a second cleaner, movably attached by hinges, in combination with the upper cleaning-screens, and the second opening from the fan provided with an adjusting screw, spring, or lever, by which the blast of air may be increased or diminished in the second cleaner; also, to various details of the apparatus, hereinafter fully set forth and described; but, that our invention may be fully understood, we will describe the same in detail by aid of the accompanying drawings.

Figure 1:
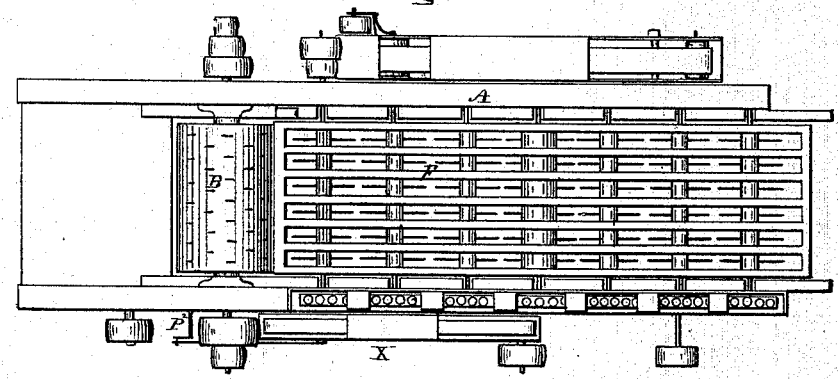
Figure 2:
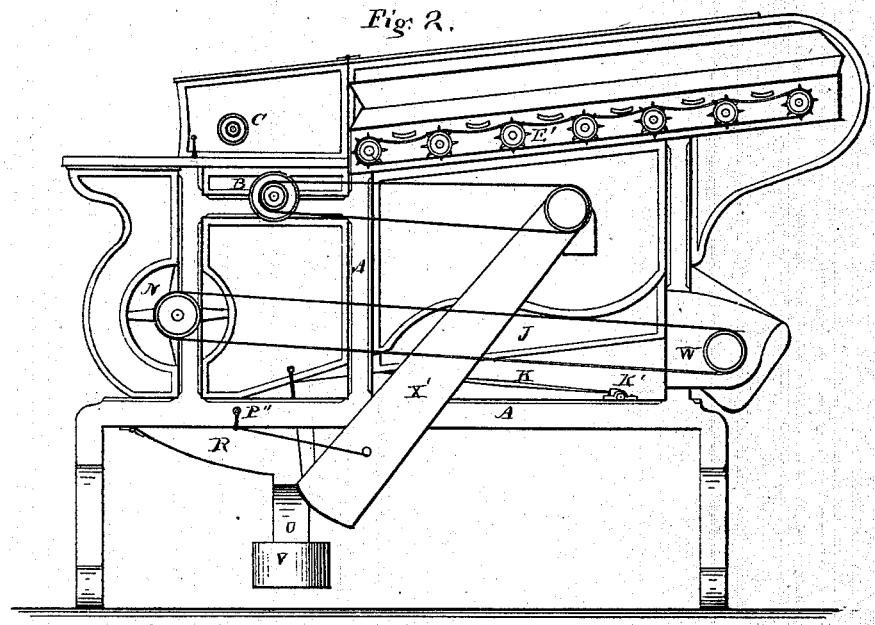

Figure 1, Sheet 1, is a top or plan view. Fig. 2, Sheet 1, is a side elevation. Fig. 3, Sheet 2, is a longitudinal section. Fig. 4, Sheet 2, is a detached view of the toothed cylinder and ratcheted feeder and rubber. Fig. 5, Sheet 2, is a detached view of a part of toothed concave.

A is the frame and outside casing of the machine; B, the revolving toothed cylinder, which, in combination with C, the cylindrical feeder and rubber, feeds the machine and delivers the clover-heads separated from the straw to the rack F. This feeder and rubber C is formed of a series of disks, $c^1$, the peripheries of which are of unequal diameter, and present grooved and notched or ratchet-formed surfaces $c^2$, leaving grooves or channels $c^3$ between each disk $c^1$. This feeder and rubber C is designed for the double work of feeding the machine, and, in combination with the toothed cylinder B, breaking the heads of the clover from the straw, and also as a substitute for the stationary toothed "flat arch" or plane commonly set above the toothed cylinder B, and the small shaft armed with spikes or teeth, which is commonly used to feed clover-hullers. This feeder and rubber C, presenting a convex form to the revolving cylinder, and being graduated in motion to increase or decrease resistance, and having angular and grooved surfaces $c^2$ $c^3$, is free from all liability to wrap and clog by wet or damp straw, and is, therefore, very uniform in its action, while its peculiar form, receiving the teeth of the cylinder in spaces suited to their shape and size, forms a novel and efficient method of breaking the heads from the straw. Its motion is not designed to be governed by the cylinder, but fixed and regulated by means of frictional gears or belts. D is the toothed concave, which is constructed in sections for two reasons, first, in order that when breakage occurs the section broken can be cheaply restored without the loss of the whole concave; second, the sections are set apart just enough to let the hulled seed drop through to the screens free from any liability to be crushed, as in other machines. E is a separator, consisting of revolving pickers $e$ $e$ on shafts which are geared to run together by means of an endless chain operating chain-wheels $E'$, affixed on the ends of said shafts, and which are inclosed in a box at the side of the machine. Over the said picker-shafts a rack, F, is arranged, which is agitated by means of cams on the two extreme shafts. G is a board, upon which the clover-heads fall, which is placed at an inclination close to the pickers, so that they carry the clover-heads downward toward the thrashing-concave D. H is a recess in front of cylinder B, into which chaff, &c., is thrown which does not fall through the concave, and which is conducted over the end D' of the concave D, down under the concave D, by means of the inclined bottom H', to a screen, I. The screen I is set in a frame, J, which has an inclined bottom board, M, the said frame being suspended by means of straps L, and is agitated or shaken by means of a connecting-rod, K, attached to the under side, and operated by a crank-shaft, K', set in the lower frame of the machine. N is a fan of the ordinary construction. Under said frame is placed a second cleaner, consisting of a screen, P, and inclined board P', suspended by straps and arranged to be shaken by an oscillating crank-shaft, P''. Underneath said screen P is a passage, R, for a second blast of air from the fan, and has a gate, S, arranged at its intersection with the fan-chamber, and is made adjustable by a set-screw, T, for regulating the said blast. At the lower end of the passage is a conductor, U, for conveying the cleaned seed into a receiver. The lower end of said conductor has a hood, V, which covers the receptacle for the cleaned seed, and prevents the ingress of dust thereto. At the right-hand end of the machine is a trough, W, in which is a revolving conveyer for taking such unscreened stuff as falls into it from the screen I to an elevator at the side of the machine, and is conveyed back to the receiving-board G. A similar trough and revolving conveyer is placed under the second screen P, and such stuff as is not screened here is conveyed back to the screen I by an elevator, X', on the opposite side of the machine.

The operation of this machine is as follows: The clover to be hulled is fed to the apparatus at 1; the heads and straw are then separated by the rubber C and pass in the direction of the arrow 2, Fig. 3, onto the rack F, where the pickers e e separate the heads from the straw, the heads falling through the rack onto the receiving-board G, and thence they are conveyed by the reverse motion of the pickers, as indicated by the arrow 3, Fig. 3, to the hulling-concave D, where the seed is thrashed out and falls through onto the screen I, all unthrashed matter being conveyed by the revolving cylinder B, over the end of the concave D, into the recess H, from which it works down also onto the screen I. The straw remaining on the upper side of the screen F is carried off by the pickers e and discharged out at the end 4 of the machine and deposited on the ground. The seed and chaff, passing through and over the end of the concave D onto the screen I, are separated by the agitation of such screen I, the seed falling through the screen I onto the board M, while the chaff and unthrashed matter fall onto the trough W, and that portion which is not blown out by the action of the fan is conveyed back to the table G to be again operated upon. The thrashed seed now falls down the board M onto a second screen, P, and is again shaken, after which it falls upon the board P', and is subjected to a second blast of air from the passage R, and is, therefore, thoroughly deprived of all dust and other extraneous matter. The trash which falls from screen P passes into the conveyer X, and is carried back to the screen I by the elevator X' to be rescreened.

The top covering of this machine is made in parts and hinged together, so that a part may be turned back, or the whole top may be removed, at pleasure, for the convenience of getting at the interior.

Having thus described our invention, what we claim, and desire to secure by Letters Patent, is—

1. The combination, with the revolving toothed cylinder B and the thrashing concave D, constructed in sections and provided with projecting teeth, of a cylindrical feeder, C, formed of a series of disks, c, the peripheries of which present grooved and notched or ratchet-formed surfaces, substantially as shown and described.

2. The combination, with the toothed cylinder B, divided toothed concave D, and feeder C, of the separator E, consisting of a series of revolving pickers, e, movable rack F, and inclined deck-board G, substantially as and for the purposes shown and described.

3. The combination, with the toothed cylinder B, concave D, feeder C, and separator E, operating as described, of the recess or chamber H, inclined bottom H', and vibrating screen I, substantially as set forth.

4. In combination with the bottom board M of a screen-frame, J, and the fan N, the second cleaner, consisting of a screen, P, crank-shaft P'', passage R, and adjustable gate S, substantially as and for the purposes set forth.

DAVID LIPPY.
Z. S. STOCKING.

Witnesses:
F. W. WAGNER,
JAMES R. BRISTO.